A. V. MITCHELL.
SPRING WHEEL HUB.
APPLICATION FILED DEC. 9, 1913.
1,242,463.
Patented Oct. 9, 1917.
2 SHEETS—SHEET 2.
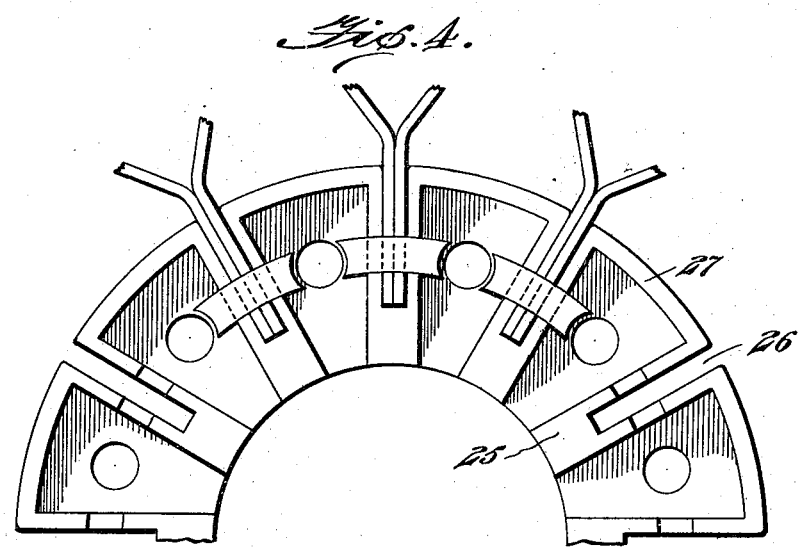
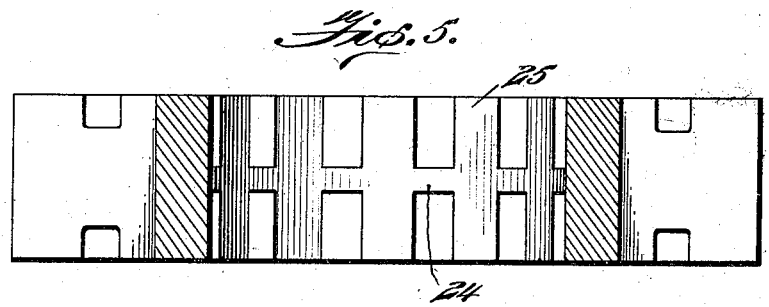
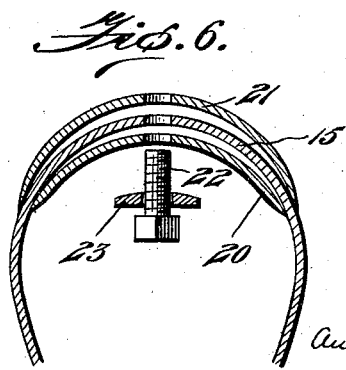

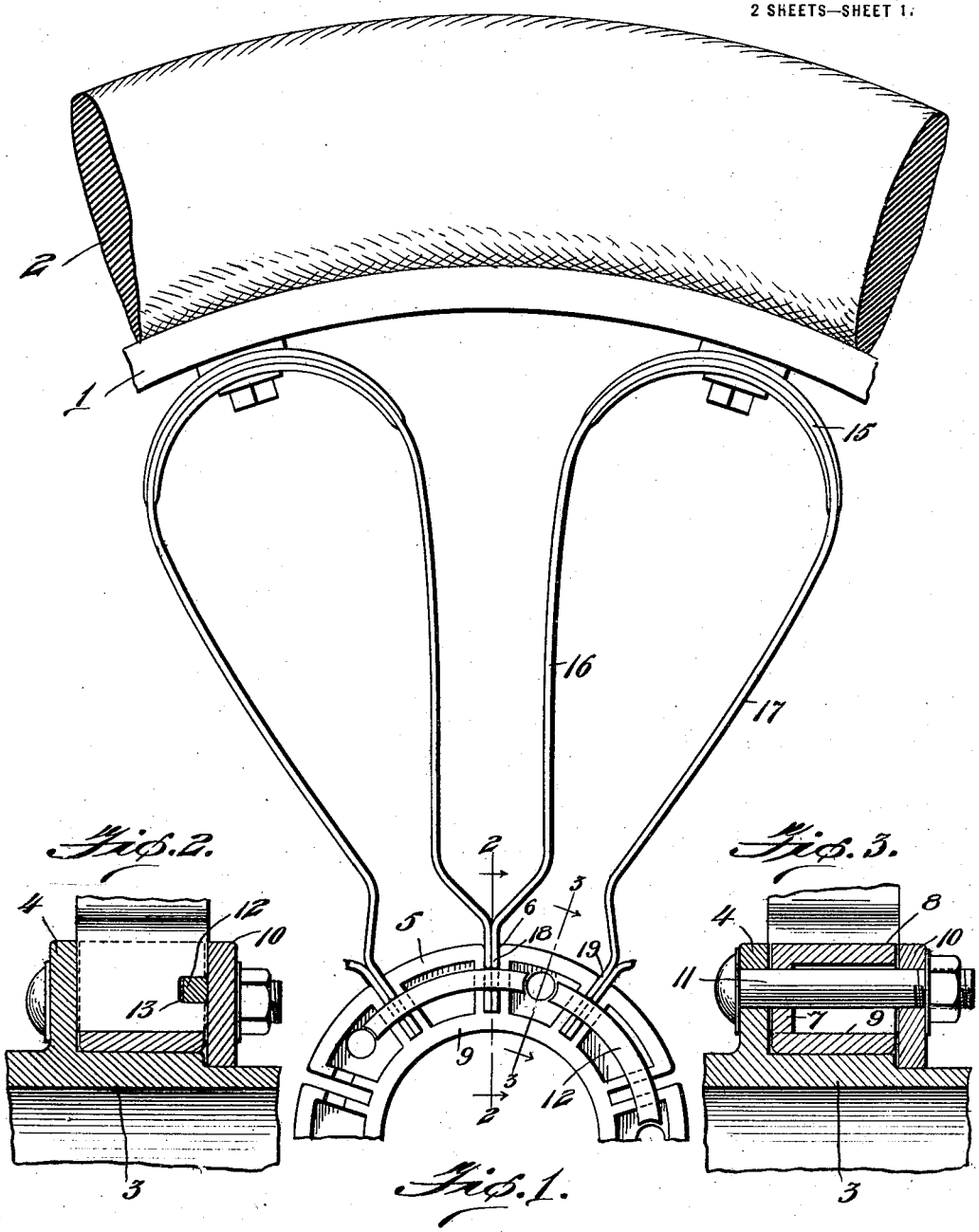

UNITED STATES PATENT OFFICE.

AUGUSTA V. MITCHELL, OF WASHINGTON, DISTRICT OF COLUMBIA.

SPRING-WHEEL HUB.

1,242,463.

Specification of Letters Patent.

Patented Oct. 9, 1917.

Application filed December 9, 1913. Serial No. 805,599.

*To all whom it may concern:*

Be it known that I, AUGUSTA V. MITCHELL, a citizen of the United States, residing at city of Washington, District of Columbia, have invented certain new and useful Improvements in Spring-Wheel Hubs, of which the following is a specification.

This invention has reference to the construction of vehicle wheels adapted to give the necessary resiliency without the use of pneumatic rubber tires.

It has been my object to improve the means for securing the spring spokes in such wheels to the rim and also to the hub. It has been the intention to secure the spokes in such a way that they will not only be held rigidly and firmly while permitting the necessary yielding action in operation, but also to provide a construction which can be easily applied without undue expense to vehicles now in existence. The hub construction which includes means for receiving and holding the ends of the spring spokes can be applied to hubs of different sizes without material alterations. The novel features of the invention will be apparent from the following description, taken in connection with the drawings.

In the drawings,—

Figure 1 is a side view of a portion of a wheel having my invention applied thereto, the hub proper and its clamping plates being omitted.

Fig. 2 is a section on the line 2—2 of Fig. 1 when the hub and clamping plates are in position.

Fig. 3 is a section on the line 3—3 of Fig. 1 when the hub and clamping plates are in position.

Fig. 4 is a side view of a portion of a modified form of spoke receiving member at the hub.

Fig. 5 is a bottom plan view of what is shown in Fig. 4, and

Fig. 6 is a detail view of the end of a spoke with its reinforcing springs adapted to be secured to the rim.

In the manufacture of wheels making use of the spring metal spokes for the purpose of giving resiliency to the wheel, it is necessary that the spokes be firmly held in place against lateral twisting or bending and against rattling, and it is desirable that to accomplish this result, the spring spokes be under some normal tension. In view of the fact that there are a very large number of vehicles in existence making use of a rigid wheel construction with pneumatic tires, it has been found desirable to make the spring wheel construction in such form that it can be applied to the hubs of various sizes now in use on vehicles so that the spring wheels may be substituted easily for the rigid wheels.

In the drawings I have shown a wheel rim 1 carrying a tire 2 which may be of solid rubber, and in Figs. 2 and 3 I have shown a hub construction for holding the inner ends of the spring spokes. The hub construction may embody the ordinary hub proper 3 which has on it a flange 4 which is usually formed integrally with the hub, but it is to be understood that the manner of securing the flange to the hub forms no part of my invention. In Fig. 1 I have shown one form of spoke receiving member 5 which has a central opening fitting on the outer cylindrical surface of the hub 3 and against the flange 4. This hub member has radial slots 6 extending inward from the outer periphery some distance but not reaching the central cylindrical opening therein, these slots being wide enough to just receive two end sections of adjacent spring spokes, as shown in Fig. 1. The member 5 in the form shown in Fig. 1 is cored out between the slots but leaving solid portions where the slots are formed and also leaving a peripheral flange or section 7 connecting the inner and lower margins of the member for the purpose of strengthening it and also leaving an outer margin 8 and an inner margin 9 connecting the solid portions in which the slots are formed. The inner margin or rim 9 furnishes a bearing throughout its full width on the hub 3, and since the inner ends of the slots 6 are at some distance from this inner margin, it will be observed that the central opening in the member may be changed in size to fit a hub of a larger size by simply boring it out to a slightly greater diameter. This change to make the member fit a hub of a different size will not affect that portion of the member which holds the spokes, and, therefore, necessitates no change in that part of the device. A clamping flange 10 fits over the hub, and, together with the flange 4, constitutes means for clamping the ends of the spokes in place in the slots in the member 5. Bolts 11 pass through the two flanges and through the member 5 at the bored-out portions and serve to draw the two flanges together against the spokes, and it will, of course, be understood that the number of these bolts may be varied in accordance with the wishes of the particular manufacturer. A locking means 12, shown in the form of a series of segments of a ring, may be placed in a groove 13 around the edge of the member 5, and it will enter notches in the sides of the spring spokes so as to lock them against any end movement. The locking member 12 may be formed of a series of segmental sections so that any one section may be removed to permit the removal of a spoke without disturbing the remaining sections, and in manufacturing the device the locking member may be inserted in the form of a complete ring which is then cut into sections by the boring operation which makes the holes for the bolts 11, those bolts fitting between adjacent ends of the locking members and holding them against any material longitudinal movement. It will be understood that the locking member may be used on either or both sides of the spoke receiving member, the groove for such locking member being shown on both sides in the form illustrated in Fig. 5.

The spokes which I use are made of bent, resilient metal which is symmetrically curved at the part 15 adjacent the rim, and each spoke has two legs 16, 17 extending into the hub where the ends 18, 19 fit in the grooves or slots 6. Adjacent the hub the two legs of each spoke are bent in toward each other and then curved outwardly away from each other as they extend out toward the rim. The ends 18 and 19 have notches on one or both sides to receive the locking ring or key 12. At the rim a short leaf spring 20 is placed on the inside of the bent portion of the spoke, and a short leaf spring 21 is placed on the outside, the curvature of the spring 20 being less than the curvature of the portion 15 of the spoke, and the curvature of the spring 21 being greater than the curvature of the spoke. Any suitable fastening means may be used to secure the spoke, together with the springs 20 and 21, to the rim, the particular fastening means shown in Fig. 6 being a bolt 22 passing through the spoke and springs and having a bearing member 23 fitting against the inner side of the spring 20. When the parts are drawn up tight by the fastening means the springs 20 and 21 are placed under normal tension, the inner spring tending to spread the end of the spoke, and the outer spring tending to contract it, and thus when the spoke is bent under the strains of actual use, the springs 20 and 21 will continue to exert pressure against the spoke whether it is contracted or expanded. The spokes are placed in the wheel between the hub and the rim under slight tension so that they will always be tight and will not rattle or become loose. The fact that the portions of the spokes 18 and 19 which extend into the spoke supporting member 5 have a slightly greater width than the thickness of the member 5 makes it possible to clamp the sides of the spokes by the clamping plates 4 and 10 for a considerable distance, thus preventing side twisting of the spokes.

The modified form of spoke supporting member shown in Fig. 4 embodies a central radial web 24 and the solid radial portions 25 extending across the web and having the slots 26 therein to receive the ends of the spokes. In other words, the spoke supporting member is cored out on both sides, leaving a web in the center, and the solid portions 25 extend entirely into the central opening which fits on the hub proper. These solid portions extend the full width of the spoke supporting member and thus furnish bearings throughout the full width at intervals around the circumference, thus tending to prevent any twisting of the member on the hub proper. The grooves or slots 26 terminate some distance from the inner opening of the spoke supporting member, and, therefore, the inner opening may be enlarged by boring to make it fit hubs of different sizes. Its structural features and its holding capacity will be exactly the same when bored out for different sizes. I preferably leave a circumferential web 27 at the outer margin of the spoke supporting member for the purpose of both strengthening the device and on account of the appearance. It will be observed that the construction is such that the spoke supporting member will be light, but at the same time will be strong and rigid. The locking ring made in sections may be used in the same way in this modification of the spoke supporting member as in that shown in Fig. 1, and the locking member may be used on either or both sides.

Having thus fully described my invention, what I claim is:

1. In a device of the class described, the combination with a hub, of clamping flanges mounted thereon, a spoke receiving member fitting said hub between said flanges having radial slots in its outer margin, spring spokes fitting in said slots, a locking ring made in sections fitting in a groove in the side face of said member and in notches in the edges of said spokes, and bolts passing through said flanges and between the ends of adjacent sections of said locking ring to hold the parts in position.

2. In a device of the class described, the combination with a hub member having slots extending therein to receive the ends of spring spokes, of a wheel rim, spokes made up of bent spring metal, each spoke having a symmetrically bent portion adjacent the rim and two legs extending into the hub, the ends of the said legs entering adjacent slots, the said legs being bent inwardly toward each other adjacent the hub, means for clamping the sides of said ends in said slots for a considerable distance to prevent side turning, means for locking said ends in said slots, reinforcing leaf springs fitting on the inside and on the outside of the bent portion of said spoke next to the rim, the inner leaf spring having normally a less curvature and the outer leaf spring having a greater curvature than the portion of the spoke to which they are applied, and means for securing said spoke to the rim and said leaf springs to the spoke, the said leaf springs being bent to fit closely against and to correspond in curvature to said spoke.

In testimony whereof I affix my signature in presence of two witnesses.

AUGUSTA V. MITCHELL.

Witnesses:
GERTRUDE M. STUCKER,
J. A. WATSON.

Copies of this patent may be obtained for five cents each, by addressing the "Commissioner of Patents, Washington, D. C."